April 17, 1951 H. L. RAWLINS ET AL 2,549,336
CIRCUIT INTERRUPTER
Filed May 27, 1944 2 Sheets-Sheet 1
Fig.1.
Fig.2.
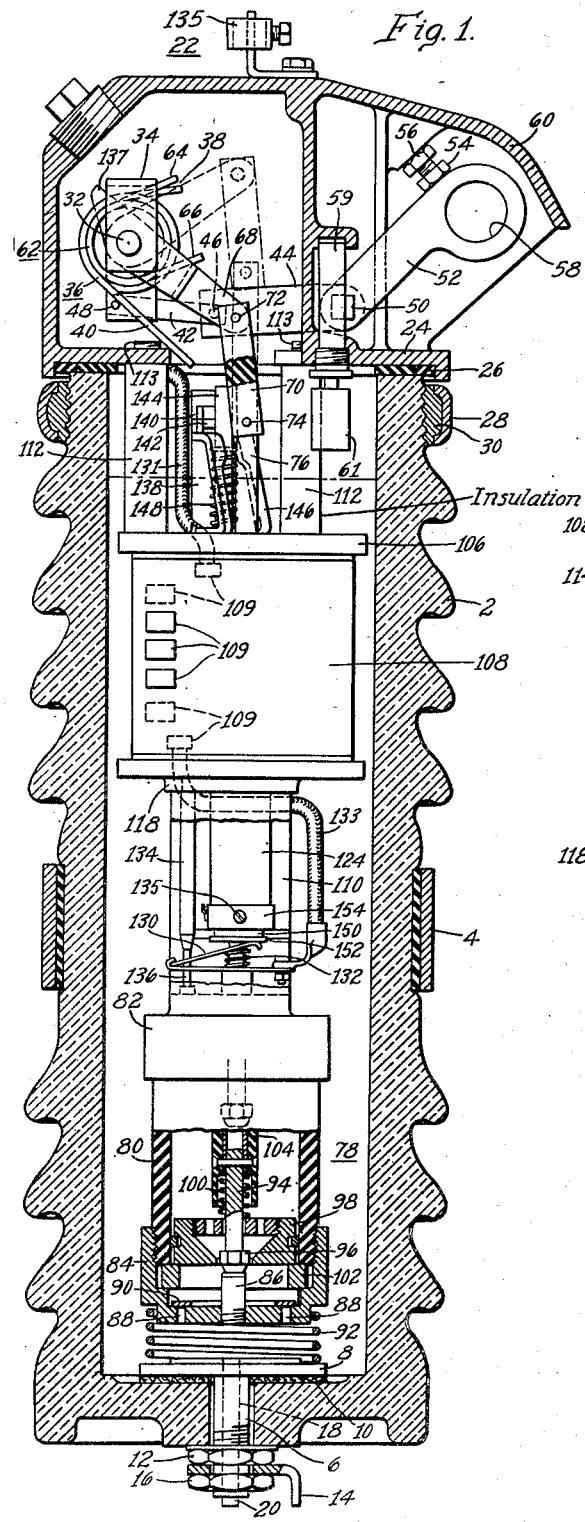
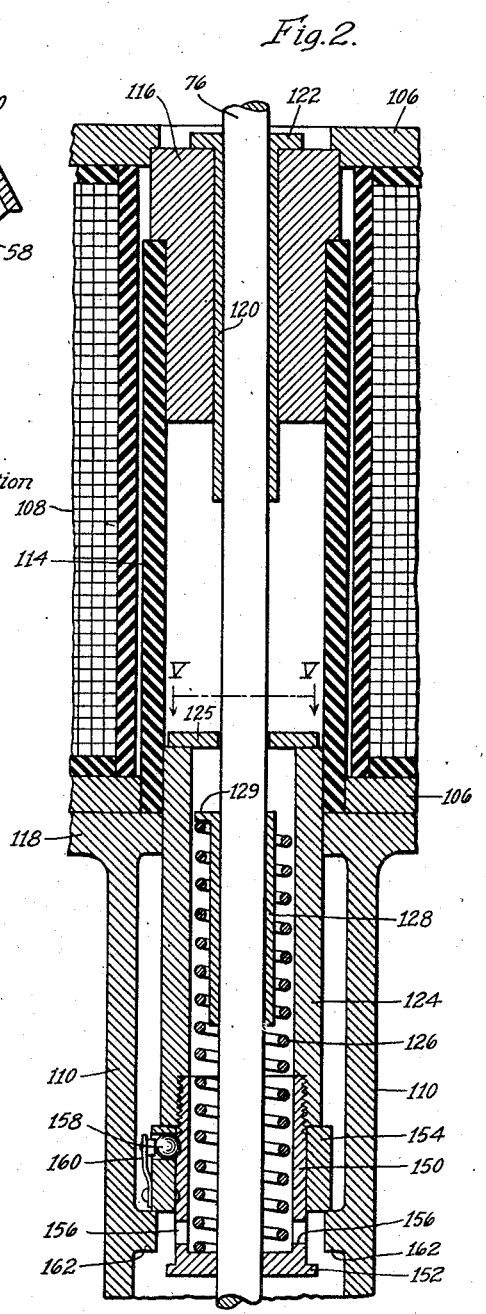
INVENTORS
Herbert L. Rawlins and
James M. Wallace.
BY
Ralph H. Swingle
ATTORNEY April 17, 1951 H. L. RAWLINS ET AL 2,549,336
CIRCUIT INTERRUPTER
Filed May 27, 1944 2 Sheets-Sheet 2
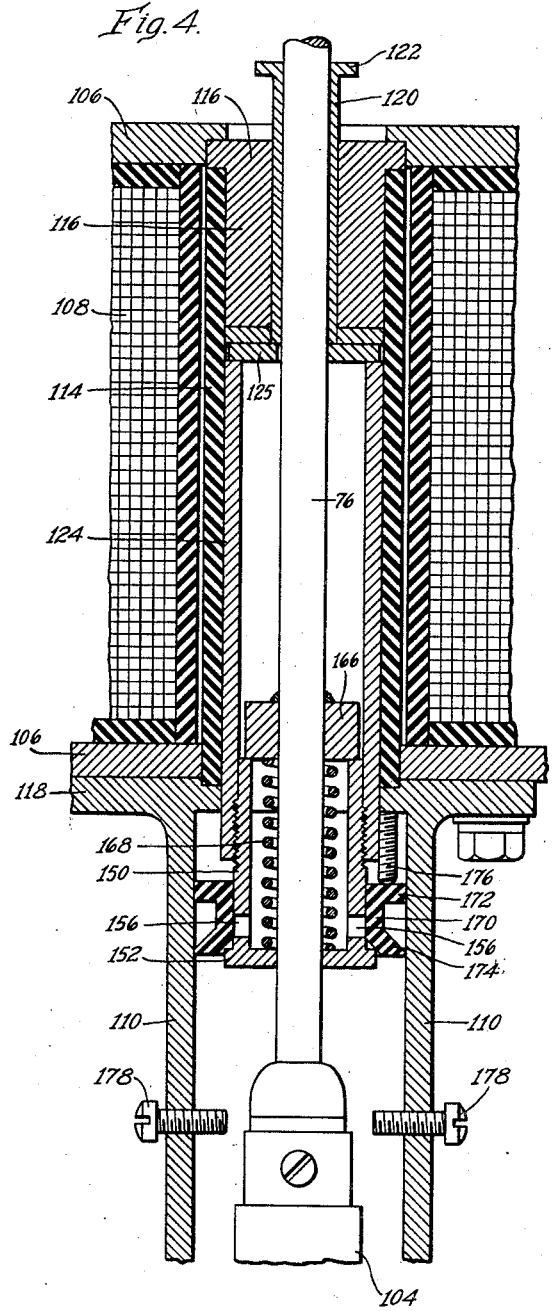
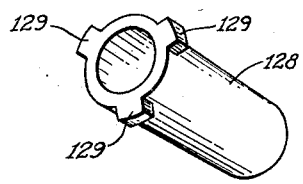
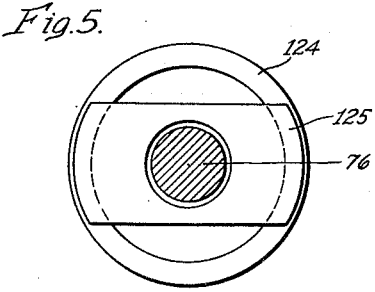
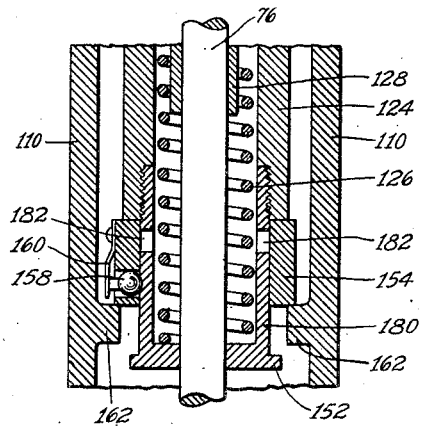
WITNESSES:
C. J. Weller.
A. T. Stratton
INVENTORS
Herbert L. Rawlins and
James M. Wallace.
BY
Ralph H. Swingle
ATTORNEY Patented Apr. 17, 1951

2,549,336

UNITED STATES PATENT OFFICE 2,549,336

CIRCUIT INTERRUPTER

Herbert L. Rawlins, Pittsburgh, and James M. Wallace, Braddock, Pa., assignors to Westinghouse Electric Corporation, East Pittsburgh, Pa., a corporation of Pennsylvania Application May 27, 1944, Serial No. 537,760

17 Claims. (Cl. 200—89)

This invention relates to automatic reclosing circuit breakers in general, and more especially to such breakers having different circuit opening times for closely succeeding circuit opening operations.

In certain applications of automatic reclosing circuit breakers, such as in the protection of lateral branch circuits having transformers connected thereto by fuses, it is desirable that the breaker open rapidly upon the occurrence of an overload in order to prevent blowing of the fuses, so that if the fault is temporary, service will be fully restored, without renewing fuses, upon automatic reclosure of the breaker. However, if the fault is permanent, it is desirable that the faulty branch circuit be disconnected from the circuit by blowing of the fuses, so that reclosure of the breaker will restore service to the other branches of the circuit. In order to give time for the fuses on the faulty branch to blow, it is necessary that at least the second closely succeeding circuit opening operation of the breaker be delayed a predetermined time.

One object of this invention, therefore, is to provide novel means for causing closely successive circuit interrupting operations of an automatic reclosing circuit breaker to have different time characteristics.

More specifically, another object of this invention is to provide in an automatic reclosing circuit breaker having fluid means for delaying operation of the breaker to open the circuit, novel means for rendering such fluid means more or less effective, dependent upon the particular circuit interrupting operation in any sequence of closely succeeding circuit interrupting operations.

Another object of this invention is to provide in an automatic reclosing circuit breaker, novel means for causing an initial circuit opening operation of the breaker to occur substantially instantaneously in response to an overload, and for causing at least one of the closely succeeding circuit interruptions to be delayed a predetermined time.

Most faults are of a temporary nature, and will either clear themselves, or will be isolated upon one or two operations of an automatic reclosing circuit breaker. Accordingly, while it is desirable that the breaker operate only a certain number of times on faults of a permanent nature and then automatically remain open, it is also required that a breaker having different opening time characteristics on closely succeeding operations, be constructed so as to automatically reset on any lesser number of operations, so that upon the occurrence of a fault at a later time, closely succeeding opening operations of the breaker will have their time characteristics arranged in the same sequence.

Accordingly, another object of this invention is to provide in an automatic reclosing circuit breaker of the type which remains open in response to a predetermined number of closely succeeding operations, novel means providing the same sequence of differing opening time characteristics on each sequence of closely succeeding operations thereof.

Another broad object of this invention is to provide novel means for causing different time periods between the occurrence of an overload through circuit interruption to reclosure of the circuit, in closely succeeding operations of an automatic reclosing circuit breaker.

These and other objects of this invention will become more apparent upon consideration of the following detailed description of preferred embodiments thereof, when taken in connection with the attached drawings, in which:

Figure 1 is a longitudinal sectional view through a circuit breaker casing with the mechanism in the casing embodying this invention being shown partially in elevation, and partially in section;

Fig. 2 is an enlarged, longitudinal sectional view of a part of the mechanism shown in Fig. 1;

Fig. 3 is a perspective view of a part of the mechanism of the breaker shown in Figs. 1 and 2;

Fig. 4 is a view similar to Fig. 2, but showing a modified form of the invention, with the parts in the position they occupy when the circuit breaker is open;

Fig. 5 is a transverse sectional view of a portion of the mechanism shown in Figs. 1, 2 and 4, and taken substantially on the line V—V of Fig. 2; and Fig. 6 is a partial longitudinal sectional view of still another modified form of the invention.

The invention is illustrated on the drawings as being embodied in one form of automatic reclosing circuit breaker construction such as that disclosed in the J. M. Wallace Patent No. 2,333,604, issued November 2, 1943, and assigned to the same assignee of this invention. Although this invention is illustrated as applied to the particular mechanism illustrated in the Wallace patent wherein it has certain particular novel features of cooperation, it will be apparent that the invention may be used with other types of circuit breakers, and even with apparatus other than circuit breakers. The specific circuit breaker illustrated comprises, in general, a tubular casing 2 of insulating material such as porcelain or the like. Casing 2 has an open top and a closed bottom which is provided with a substantially centrally located aperture for the reception of a terminal bolt 6. An enlarged contact head 8 is provided integral with terminal bolt 6 to be seated on the inner side of the bottom wall of casing 2, with a gasket 10 provided to prevent leakage through the bottom casing aperture. Terminal bolt 6 is provided with a nut 12 to secure the bolt in position, and a circuit conductor 14 may be secured to the bolt by means of a second nut 16. Terminal bolt 6 is preferably provided with a drain passage 18 which may be normally closed by a threaded drain plug 20.

Casing 2 may have a supporting bracket 4 secured at an intermediate portion thereof, by any suitable means, for the purpose of supporting the casing on a cross arm or the like. A cover casting 22 is provided for the open top of casing 2, and the casting has a lower flange 24 adapted to be seated on gaskets 26 provided on the open upper end of casing 2. The cover casting may be secured to casing 2 by any desired securing means engaging the casting and a securing ring 28 secured adjacent the upper end of casing 2, for example as by cast metal 30 interlocked with ring 28 and with a plurality of grooves provided on the outer surface of casing 2. The cover casting is provided with a chamber portion opening into casing 2, and a shaft 32 is provided in this chamber portion, being mounted at its opposite ends in opposite walls of the casting. Shaft 32 supports a substantially U-shaped spring support 34, having the leg portions thereof rotatably mounted on shaft 32. A coil lockout spring 36 is coiled about shaft 32, and has one end 40 thereof engaging flange 24 of the cover casting, and has the other end 38 thereof engaging spring support 34, so as to bias the spring support for counterclockwise movement about shaft 32. Spring support 34 is, however, normally prevented from counterclockwise movement under the influence of lockout spring 36 by toggle links 42 and 44, pivotally connected together as at 46, with toggle link 42 pivoted to the spring support as at 48, and toggle link 44 mounted on a shaft 50 extending outside the chamber portion of cover casting 22. Toggle links 42 and 44 are normally maintained at an overcenter position by engagement of an operating handle 52, also rigidly mounted on shaft 50, with an adjustable stop screw 54 mounted on the cover casting beneath a hood portion 60, integral therewith. A lock nut 56 is preferably provided for stop screw 54 to secure it in adjusted position. Operating handle 52 is provided at its outer end with a hookeye aperture 58, to be engaged by a hookstick operating member, or the like. Preferably the cover casting also includes a sight glass 59 supported thereon beneath hood 60, for observation of an extension of a float 61, so that the liquid level within casing 2 may be readily observed from the exterior of the casing.

A contact closing spring 62 having coils of smaller diameter than lockout spring 36 is also provided on shaft 32 within the chamber portion of the cover casting, so as to be telescoped within the lockout spring. One end 64 of contact closing spring 62 engages with the bight portion of spring support 34, and the other end 66 of the contact closing spring engages a contact operating lever 68, which is pivotally mounted on shaft 32. Contact closing spring 62 biases contact operating lever 68 in a clockwise direction, so long as spring support 34 is held at the position shown in Fig. 1 by toggle links 42 and 44. Operating lever 68 is connected with a contact operating rod 76 by means of connecting links 70 of insulating material, by pivot pins 72 and 74.

The contact operating rod 76 extends down through casing 2 into an arc chamber 78, in which the breaker contacts are located. Arc chamber 78 preferably includes a cylindrical wall 80 of insulating material, such for example as fiber or the like, having a top cap 82 and bottom cap 84 secured on the opposite ends thereof, such for example as by being threadedly mounted thereon. Bottom cap 84 of the arc chamber is provided with a fixed contact 86 extending into the arc chamber, and inlet openings 88 are provided about the fixed contact and are adapted to be controlled by a valve ring 90, freely movable between the end wall of cap 84 and a stop ring 102, secured between an internal shoulder on the cap and the lower end of cylindrical member 80. The bottom cap 84 of the arc chamber is also provided with an external shoulder for receiving one end of a coil compression spring 92, the other end of which is adapted to engage the head 8 of terminal bolt 6. Spring 92 should be of a relatively good electrical conducting material, and is normally compressed so as to provide good contact with head 8 and cap 84 to form a good conducting path between these two parts.

A contact extension rod 94 is secured to the lower end of contact operating rod 76 within the arc chamber, and this in turn has an enlarged contact head 96 for engagement with fixed contact 86. A liquid director 98 is slidably mounted on contact extension rod 94 between contact head 96 and the lower end of a sleeve 104 of insulating material which surrounds the contact actuating rod 76 where it extends into the arc chamber 78. A coil compression spring 100 reacts between an internal shoulder on the lower end of sleeve 104, and the liquid director, in order to bias the liquid director toward contact head 96. In the closed circuit position the liquid director is maintained at an intermediate position by engagement with stop ring 102, as illustrated in Fig. 1.

A solenoid coil 108, having a plurality of taps 109, is adapted to be supported in a solenoid supporting frame 106 connected to cap 82 of the arc chamber, by spaced supporting plates 110, and with flange 24 of cover casting 22 by means of supporting sleeves 112 of insulating material, secured to frame 106 and flange 24, for example, as by screws 113. Referring to Fig. 2, it is seen that the solenoid coil 108 is annular in form, and that a sleeve 114 is provided centrally of the coil to form a dashpot cylinder therein. Sleeve 114 is held against a shouldered plug 116 at one end by a cross frame member 118, integral with supporting plates 110. Solenoid supporting frame 106 may be secured to frame member 118 in any desired manner, preferably by detachable securing means such as screws or the like. An actuating sleeve 120 is disposed between contact actuating rod 76 and shoulder plug 116, and is provided with an outwardly extending flange 122 above plug 116, for a purpose to be described.

A movable core 124 for coil 108 is adapted to be slidably mounted within dashpot sleeve 114, in a manner such that it forms a dashpot piston. Core 124 is illustrated as being in the form of a cylindrical member having a closed lower end wall, and having a thrust bar 125 secured across the upper end thereof, for a purpose to be described. A coil compression spring 126 reacts between the closed lower end of core 124 and flange portions 129 (Figs. 2 and 3) on a stop sleeve 128, suitably secured on contact actuating rod 76. Below solenoid core 124, contact actuating rod 76 is provided with a pivoted latch member 130, normally biased upwardly as viewed in Fig. 1, by a coil compression spring 132. Latch plate 130 is provided with one aperture for receiving the contact actuating rod, which is large enough to permit substantial pivotal movement of the latch plate, and with a smaller aperture adjacent its pivot for receiving a latch rod 134. The aperture in latch plate 130 for rod 134 is but slightly larger than the rod, so that when contact actuating rod 76 moves upwardly, any tendency of the latch plate to bind on rod 134 is overcome by pivoting of the latch plate in a clockwise direction. However, on attempted downward movement of contact actuating rod 76, the aperture in latch plate 130 is caused to bind on rod 134 by counterclockwise rotation of the latch plate induced by spring 132. The latch may be released by depressing the free end of latch plate 130, that is, by exerting a force thereon in a direction to cause clockwise rotation thereof. The lower end of latch rod 134 is reduced in section as at 136, so that no latching action can occur during travel of latch plate 130 over reduced section 136 of the latch rod.

The electrical circuit through the breaker described above, extends from a terminal 135 provided on cover casting 22, through a conductor 131 to one tap 109 of solenoid coil 108, through the coil and a flexible conductor 133 to contact actuating rod 76, to contact head 96, fixed contact 86, arc chamber cap 84, conducting spring 92 and terminal bolt 6, to a line conductor 14. This circuit provides solenoid coil 108 in series in the circuit with the breaker contacts, so that it will be responsive to currents above a predetermined value to exert sufficient force on core 124 as to cause upward movement of the core, while compressing biasing spring 126. When this occurs, core 124 moves relative to contact actuating rod 76 and contact head 96, until the closed lower end of the core engages stop sleeve 128 on the contact actuating rod, whereupon contact head 96 is caused to move upwardly with the core. It will also be observed that each time core 124 is drawn upwardly, bar 125 on the upper end thereof engages actuating sleeve 120, and moves it upwardly a predetermined distance, for a purpose which will be described. Since core 124 forms a dashpot piston working in dashpot cylinder 114, and assuming for the moment that core 124 is closed at its lower end, it will be obvious that because movement of the core must displace fluid trapped between the core and plug 116 through the relatively small clearance between the core and dashpot sleeve 114, upward movement of the core will be at a relatively slow rate, thus introducing a predetermined time delay between the occurrence of an overload of a magnitude sufficient to actuate the core, and the time when the contacts are actually separated.

As soon as the contacts separate an arc will be formed in arc chamber 78, and since this chamber is closed, at least when an arc is formed therein, pressure will be built up in the chamber and will operate on the moving contact in a piston-like manner to aid in moving contact head 96 away from fixed contact 86, and since contact actuating rod 76 is slidable relative to solenoid core 124, the pressure within arc chamber 78 may actually cause movement of contact head 96 a greater distance than it is moved by solenoid core 124. In other words, contact head 96 may have overtravel with respect to solenoid core 124. Contact opening movement of actuating rod 76 causes counterclockwise rotation of operating lever 68 and consequently stresses contact closing spring 62. Accordingly, as soon as the arc is extinguished, solenoid coil 108 is deenergized, pressure within arc chamber 78 decreases, and contact closing spring 62 would instantaneously reclose the contacts were it not for latch plate 130, which automatically latches contact actuating rod 76 at any position to which it has moved, as previously explained. When solenoid coil 108 is deenergized, core 124 is free to return to its original position under the influence of gravity when the device is mounted in vertical position, and also under the influence of coil spring 126. However, because of the dashpot action of core 124 in dashpot sleeve 114, this return movement of the core is necessarily quite slow. Since core 124 in its return movement will eventually engage the outer end of latch plate 130 to release the latch plate, reclosing movement of contact head 96 will necessarily be at approximately the same speed as return movement of core 124, until the reduced portion 136 of latch rod 134 is reached, where no further latching action is possible, and reclosing spring 62 is then free to rapidly reclose the contacts. The time delay in reclosing the contacts is desirable for several reasons, one of which may be the desire to allow sufficient time for flushing arc chamber 78, since it is preferably constructed with outlet passages controlled by check valves in end cap 82, as more particularly disclosed in the aforesaid Wallace patent. Since casing 2 is adapted to be filled with an arc extinguishing liquid, such as an insulating oil, up to the level indicated by the dot and dash lines adjacent the upper end of casing 2, arc chamber 78 will also be filled with such liquid, and during arcing this liquid deteriorates, and it is desirable to get rid of the gases formed, and replace them with fresh oil from casing 2. This automatically occurs by flow of fresh liquid through inlet apertures 88 by displacement of valve ring 90, and out-flow of the gases at the upper end of the arc chamber.

When an overload of a continuing nature appears on the circuit, it is not desired that the contacts continue to open and close indefinitely, and accordingly means is provided for maintaining the contacts separated in the event a predetermined number of closely successive closing operations occur. For this purpose, a cylindrical sleeve 138 is mounted on top of solenoid supporting frame 106, and is provided with an opening 140 adjacent the upper end thereof, for permitting access to a notched piston 142 mounted within the sleeve. Preferably the lower end of sleeve 138 is provided with a check valve controlled inlet (not shown) permitting flow of liquid solely into the lower end of the sleeve. A pawl guide rod 144 is also secured on top of solenoid supporting frame 106 adjacent cylinder 138, for guiding a generally U-shaped pawl member 146, having the bight portion and upper leg thereof longitudinally slotted for receiving guide rod 144, and having the lower leg thereof apertured for sliding movement on guide rod 144. A coil compression spring 148 reacts between a fixed collar on guide rod 144 and the lower leg of pawl 146, to normally maintain the pawl seated on supporting frame 106, and out of engagement with notched piston 142.

It is apparent that contact actuating rod 76 is at least partially received in the slot provided in the bight portion of pawl 146, so that the pawl overlies flange 122 on actuating sleeve 120. Accordingly, each time solenoid core 124 is drawn up to cause a circuit interrupting operation, pawl 146 will be moved by flange 122 to engage notched piston 142, and move it upwardly a predetermined distance. Upward movement of lockout piston 142 causes liquid to be drawn into the lower end of cylinder 138, and when the contacts reclose, pawl 146 will be returned to its normal condition shown in Fig. 1 by spring 148, leaving piston 142 at the position to which it was advanced. If the overload has cleared upon reclosure of the breaker contacts, lockout piston 142 will slowly return to its original position by displacement of the oil drawn into the lower portion of cylinder 138 past the relatively small clearance between the piston 142 and the cylinder. However, if the overload is still present upon reclosure of the contacts, they will immediately be reopened, and this time pawl 146 will advance lockout piston 142 a further amount, substantially into engagement with the knee of toggle levers 42 and 44. When the contacts reclose a second time, lockout piston 142 will again slowly reset and eventually return to its original position if the overload on the circuit has cleared. However, if the overload is still present on this second closely successive reclosure of the contacts, they will again immediately be opened, and this time lockout piston 142 will be advanced to engage toggle lever 44 adjacent the toggle knee pivot 46, to move toggle levers 42 and 44 overcenter and cause collapse of the toggle by lockout spring 36. This action of lockout spring 36 causes counterclockwise rotation of spring support 34 and consequent engagement of the bight portion of the spring support with an extension 137 of operating lever 68, to hold the contacts separated, at the dotted line position shown in Fig. 1. Furthermore, such rotation of spring support 34 renders contact closing spring 62 inoperative to close the contacts, by removing the reaction point for end 64 of this spring. After such lockout operation, the contacts may be reclosed only by operation of handle 52. When the contacts lock open, handle 52 rotating with toggle lever 44, will be moved to a position where it projects below hood 60 to thereby give a readily visible indication of the lockout position. To reclose the contacts, handle 52 must be rotated in a counterclockwise direction, in order to move toggle levers 42 and 44 back overcenter to the full-line position shown in Fig. 1. Contact closing spring 62 will then be operative to reclose the contacts at a rate regulated by the dashpot action of solenoid core 124. Toggle levers 42 and 44 may readily be moved back overcenter to the full-line position shown in Fig. 1, because lockout piston 142 starts to reset immediately after it is disengaged by pawl 146, and unless the contacts reclose on a fault, they will remain closed and all parts will reset to the full-line positions shown in Figs. 1 and 2. The contacts may be opened and closed at any time by operation of handle 52 and consequent movement of toggle levers 42 and 44 overcenter in opposite directions, respectively.

The structure thus far described is substantially all disclosed in identical form in the aforesaid mentioned Wallace patent, and, accordingly, for a more detailed description of the parts, reference is hereby made to this patent. This invention is concerned with a novel arrangement for obtaining separation of the contacts at different times following the occurrence of an overload of sufficient magnitude to cause a circuit interrupting operation, on closely succeeding circuit interruptions. This is accomplished in the embodiment of the invention shown in Figs. 1 and 2 by the dashpot formed by solenoid core 124 and dashpot sleeve 114. Solenoid core 124 is made in two parts, comprising an upper cylindrical portion and a lower portion 150 reduced in diameter and threaded into the upper tubular portion. This lower portion 150 is provided with a closed end having a central aperture for closely slidably receiving the contact actuating rod 76, and having an outwardly extending flange 152 at the lower end for defining one limit of movement of a valve sleeve 154 slidably mounted on lower portion 150 of the core, with the upper limit of movement of the valve sleeve defined by the lower end of the upper portion of core 124. Lower portion 150 of the core is provided with vent openings 156, adapted to be controlled by valve sleeve 154, in a manner to be described. Preferably valve sleeve 154 is adapted to be maintained at either of its two extreme positions by means of a ball latch 158, engageable with indentations provided in part 150 of the core, under the influence of a leaf spring 160, mounted on the valve sleeve.

In the normal closed circuit position of the circuit breaker, core 124 occupies the position shown in Figs. 1 and 2 wherein valve sleeve 154 is maintained at its upper position where vents 156 are uncovered, by engagement with stop lugs 162, integral with supporting frame plates 110. Accordingly, at this position, core 124 is relatively freely vented through openings 156, so that upon energization of coil 108 sufficiently to attract core 124 upwardly and effect a circuit opening operation, movement of the core will be relatively unimpeded, and may occur at a relatively fast rate, so that the contacts are actually separated in a relatively short time after the occurrence of the overload. However, when core 124 is adjacent the upper limit of its travel, valve sleeve 154 will engage transverse frame member 118, to prevent further upward movement of the valve sleeve, so that during continued upward movement of core 124, the valve sleeve 154 is held stationary, and the core moves to a position wherein vent openings 156 are covered by the valve sleeve 154. Now when the breaker contacts start to reclose, latch plate 130, being released by downward movement of core 124, will be released at successive positions until the reduced portion 136 of the latch rod is obtained, at a relatively slow rate, because return movement of the core 124 will be impeded by the necessity of filling the space between the core and plug 116 with liquid entering through the relatively small clearance between the core and dashpot sleeve 114, since vent openings 156 are closed. During such reclosing movement, latch plate 130 reaches reduced portion 136 of the latch rod before valve sleeve 154 engages stop lugs 162. Accordingly, at this point the contacts move independently of core 124, and are closed at a much faster rate than the rate of movement of core 124. If an overload is still present on the circuit, core 124 is immediately moved upwardly before it has traveled down far enough to reopen vents 156. Consequently, on such a closely succeeding circuit interrupting operation the contacts will not actually separate until a relatively long time has elapsed, due to the dashpot action of core 124 in dashpot sleeve 114, because vents 156 are still closed. However if the overload has cleared upon the first reclosure of the contacts, core 124 will continue its return movement to the position shown in Fig. 2 and thus move relative to valve sleeve 154 after the latter engages stop lugs 162, to thereby uncover vents 156, so that when an overload again appears upon the circuit at a later time, the first circuit opening operation will again occur substantially instantaneously.

The mechanism illustrated in Fig. 4 is in many respects like that described in connection with Figs. 1 and 2, and, accordingly, parts which are identical in both embodiments of the invention, have been identified by the same reference numerals. In the mechanism shown in Fig. 4, collar 166 replaces stop sleeve 128 shown in Fig. 2, and is secured on the contact actuating rod, for supporting a relatively small return spring 168 for solenoid core 124. A valve sleeve 170 is also provided in this embodiment of the invention, slidably mounted on lower portion 150 of core 124, to move between flange 152 and the lower end of the large upper sleeve portion of the core. Valve sleeve 170 is provided at the upper end thereof with a laterally extending flange 172, and at its lower end with an outwardly flared extension 174. In the position of the parts illustrated, the breaker contacts are open, and valve sleeve 170 is illustrated as having moved to cover vent openings 156. The operation of valve sleeve 170 to cover and uncover vent openings 156 is similar to the operation of the valve sleeve 154 previously described, and accordingly will not be repeated in detail. It is believed sufficient to merely point out that valve sleeve 170 is moved to uncover vent openings 156 by engagement of the lower flared end 174 with stop screws 178 mounted in frame plates 110, and is actuated to cover vent openings 156 by engagement with a stop screw 176. No means is provided for holding or latching valve sleeve 170 at either of its positions, since such a means is not needed at the position of the sleeve illustrated in Fig. 4, because of the very slow downward movement of core 124. When valve sleeve 170 is moved by stop screws 178 to a position above vent openings 156 and a circuit interrupting operation occurs, the valve sleeve will be held at such a position because the flared lower end 174 thereof will be acted upon by fluid forced out of vent aperture 156 during upward movement of core 124, to prevent movement of valve sleeve 170 to a position covering the vent openings. Otherwise, the arrangement illustrated in Fig. 4 operates to provide a first relatively instantaneous separation of the contacts following the occurrence of overloads above a predetermined magnitude, with time delayed reclosure of the contacts on all operations, and time delayed opening of the contacts on interrupting operations which closely succeed the first instantaneous operation, until the contacts are locked open. Here, too, in the event of the occurrence of less than the predetermined number of circuit interrupting operations necessary to cause lockout of the breaker contacts, the controlling means resets, so that when an overload appears at a later time, the time characteristics of closely succeeding circuit interrupting operations will differ in the same sequence, that is, with a first instantaneous opening of the contacts, and succeeding time delayed circuit openings.

In Fig. 6, there is illustrated an arrangement of a dashpot valve which provides a different timing sequence of circuit openings for a circuit breaker, and yet may be constructed in most respects identical with the breaker described above. In this embodiment of the invention, the lower portion 180 of core 124 is of greater length than in the previously described embodiments of the invention, and it is provided with vent openings 182 closely adjacent to the bottom of the sleeve portion 124. A valve sleeve 154 identical with that shown in Fig. 2 is provided for the lower portion 180 of the core, and it operates in the following manner:

In the normal closed circuit position of the parts shown in Fig. 6, valve sleeve 154 covers vent openings 182, so that a first circuit interrupting operation will be delayed, after energization of coil 108 sufficient to cause circuit interruption, by the dashpot action of core 124 in dashpot sleeve 114. However, such a first circuit opening operation will cause valve sleeve 154 to be moved to engage flange 152 and uncover vent openings 182, so that the reclosing operation will be relatively fast, and if a circuit interrupting operation closely follows it will also take place at a relatively rapid rate or substantially instantaneously, as distinguished from the time delay introduced in the first circuit opening operation. Closely succeeding circuit interruptions will also occur at a relatively rapid rate. However, if the fault clears prior to lockout of the breaker, core 124 will return to its normal position shown in Fig. 6 where valve sleeve 154 covers vent openings 182, so that whenever an overload again appears on the circuit the first circuit opening operation will be delayed as before.

In view of the foregoing, it is apparent that this invention provides novel means for obtaining differing periods of time between the occurrence of overloads to which the breaker responds to interrupt the circuit, and the time when the breaker contacts actually separate, on circuit interruptions which closely succeed each other, as on a continuing fault. In the embodiments of the invention shown in Figs. 1 to 5, the arrangement is such that the first circuit interrupting operation in any sequence of closely successive circuit interrupting operations prior to lockout of the breaker, always occurs substantially instantaneously, whereas the succeeding circuit interrupting operations of such a sequence are delayed a predetermined time after each reclosure of the breaker. In the embodiment of the invention shown in Fig. 6, the reverse operation is obtained, namely, a first time delayed opening of the breaker contacts in any sequence of closely succeeding circuit interrupting operations as on a continuing fault, followed by interrupting operations which occur substantially instantaneously upon reclosure of the breaker. Moreover, in each embodiment of the invention the means for controlling the opening times of closely successive circuit opening operations, resets in the event that the breaker does not go through a complete sequence of closely successive circuit interrupting operations culminating in lockout of the breaker, so that the opening times of closely succeeding circuit interrupting operations always differ in the same sequence. The different contact opening times on closely succeeding circuit interrupting operations is obtained in all embodiments of the invention by control of a vent for a fluid dashpot which is adapted to govern the rate of response of a solenoid core. In the event it is desired that all circuit interrupting operations shall occur at the same rate, a locking means, such as the set-screw 135 shown in Fig. 1, may be provided for the valve sleeves 154 and 170 to lock them in either of their extreme positions.

Having described preferred embodiments of the invention in accordance with the patent statutes, it is desired that this invention be not limited to these particular embodiments inasmuch as it will be obvious, particularly to persons skilled in the art, that many modifications and changes may be made in these particular embodiments without departing from the broad spirit and scope of this invention.

We claim as our invention:

1. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, means responsive to the first interrupting operation of any such sequence of operations for venting said dashpot so that in subsequent interrupting operations said contacts are separated substantially instantaneously upon the occurrence of said predetermined electrical condition, and means responsive to the lapse of a predetermined time, at least after any reclosing operation in such a sequence of operations, to close the vent of said dashpot means.

2. In an automatic reclosing circuit breaker, separable contacts, electroresponsive means having lost motion with respect to said contacts for separating said contacts in response to a predetermined electrical condition of the circuit, means for automatically latching said contacts separated at least a predetermined distance, said contacts biased into engagement to automatically reclose the circuit when said latch means is released, fluid dashpot means having a part mounted for limited movement from one position to another, vent means for said dashpot means, valve means controlling said vent means, means for actuating said valve means in response to movement of said movable part to each of said limiting positions, said movable part being movable with said electroresponsive means to one of its limiting positions and biased to return to the other of its limiting positions, means for releasing said latch means in response to partial return movement of said movable part, whereby upon the occurrence of said electrical condition the breaker contacts will be separated a predetermined time thereafter and if such condition exists upon automatic reclosure of said contacts they will again be separated a different predetermined time thereafter, but if said condition does not exist upon reclosure of said contacts said vent means will be actuated so that in the event said predetermined electrical condition reoccurs at a later time the breaker contacts will be separated said first predetermined time thereafter.

3. In an automatic reclosing circuit breaker, separable contacts, electroresponsive means having lost motion with respect to said contacts for separating said contacts in response to a predetermined electrical condition of the circuit, means for automatically latching said contacts separated at least a predetermined distance, said contacts biased into engagement to automatically reclose the circuit when said latch means is released, fluid dashpot means having a part mounted for limited movement from one position to another, vent means for said dashpot means, valve means controlling said vent means, means for actuating said valve means in response to movements of said movable part to each of said limiting positions, said dashpot means offering resistance to movement of said movable part in both directions, said movable part being movable with said electroresponsive means to one of its limiting positions to delay separation of said contacts a predetermined time after the occurrence of said predetermined condition when said valve means is closed, said movable part biased to return to the other of its limiting positions, means for releasing said latch means in response to partial return movement of said movable part to delay reclosure of said contacts a predetermined time when said valve means is closed, whereby upon the occurrence of said electrical condition the breaker contacts will be separated a predetermined time thereafter, and if such condition exists upon automatic reclosure of said contacts they will again be separated a different predetermined time thereafter, but if said condition does not exist upon reclosure of said contacts said vent means will be actuated so that in the event said predetermined electrical condition reoccurs at a later time the breaker contacts will be separated said first predetermined time thereafter.

4. In an automatic reclosing circuit breaker, separable contacts, solenoid means having a movable core which is movable relative to said contacts before causing separation of said contacts in response to predetermined energization of said solenoid means, said contacts automatically reclosing in response to a circuit interrupting operation, said solenoid core constituting one element of a fluid dashpot means for delaying movement of said core at least during movement of said core relative to said contacts a predetermined time after said predetermined energization of said solenoid means, means responsive to a sequence of a predetermined number of closely successive circuit interrupting operations for causing said contacts to remain separated, and means mechanically operated by said breaker during each circuit opening and closing cycle of operation thereof for venting said dashpot means on at least one predetermined circuit interrupting operation of any such sequence of operations, whereby on said one predetermined operation the contacts are separated substantially instantaneously upon the occurrence of said predetermined electrical condition, and on another operation of any such sequence of operations said dashpot means is effective to delay separation of said contacts.

5. In an automatic reclosing circuit breaker, separable contacts, solenoid means having a movable core which has lost motion with respect to said contacts for separating said contacts in response to predetermined energization of said solenoid means, said contacts automatically reclosing in response to a circuit interrupting operation, said solenoid core constituting one element of a fluid dashpot means for delaying movement of said core at least during movement of said core relative to said contacts a predetermined time after said predetermined energization of said solenoid means, means for automatically latching said contacts separated at least a predetermined distance, said contacts biased into engagement to automatically reclose the circuit when said latch means is released, valve means for controlling said vent means, means for actuating said valve means in response to movement of said core to each limit of its movement in opposite directions, said core being actuated by said solenoid means to one of its limiting positions and biased to return to the other of its limiting positions, means for releasing said latch means in response to partial return movement of said core, whereby upon the occurrence of said electrical condition the breaker contacts will be separated a predetermined time thereafter and if such condition exists upon automatic reclosure of said contacts they will again be separated a different predetermined time thereafter, but if said condition does not exist upon reclosure of said contacts said vent means will be actuated so that in the event said predetermined electrical condition reoccurs at a later time the breaker contacts will be separated said first predetermined time thereafter.

6. In an automatic reclosing circuit breaker, separable contacts, electroresponsive means having lost motion with respect to said contacts for separating said contacts in response to a predetermined electrical condition of the circuit, said contacts automatically reclosing in response to a circuit interrupting operation, fluid dashpot means having a part movable with said electroresponsive means for delaying movement of said electroresponsive means at least during movement thereof relative to said contacts to thereby delay separation of said contacts a predetermined time after the occurrence of said predetermined electrical condition, said movable part having a vent for said dashpot means, movable valve means on said movable part for controlling said vent, said movable part being biased to return to its original position, spaced means for actuating said valve means in response to movement of said movable part to spaced limiting positions by said electroresponsive means and said bias, respectively, and said part during its return movement controlling reclosure of said contacts.

7. In an automatic reclosing circuit breaker, separable contacts, electroresponsive means having lost motion with respect to said contacts for separating said contacts in response to a predetermined electrical condition of the circuit, said contacts automatically reclosing in response to a circuit interrupting operation, fluid dashpot means having a part movable with said electroresponsive means for delaying movement of said electroresponsive means at least during movement thereof relative to said contacts to thereby delay separation of said predetermined electrical condition, said movable part having a vent for said dashpot means, movable valve means on said movable part for controlling said vent, said movable part being biased to return to its original position, spaced means for actuating said valve means in response to movement of said movable part to spaced limiting positions by said electroresponsive means and said bias, respectively, and said part during the first part of its return movement controlling reclosure of said contacts, whereby upon the occurrence of said electrical condition the breaker contacts will be separated a predetermined time thereafter, and if such condition exists upon automatic reclosure of said contacts they will again be separated a different predetermined time thereafter, but if said condition does not exist upon reclosure of said contacts said vent means will be actuated so that in the event said predetermined electrical condition reoccurs at a later time the breaker contacts will be separated said first predetermined time thereafter.

8. In a device of the type described, the combination with a solenoid having a movable core, dashpot means for controlling the rate of movement of said core, said core being moved upon energization of said solenoid from its normal position to another position and being biased to return to said normal position, said dashpot means having a vent, valve means controlling said vent, and means located at points adjacent each end of the path of travel of said core so as to be mechanically operated thereby in response to movement of said core to both of its said positions for operating said valve means only at a point adjacent the end of movement of said core to either of said positions, whereby movement of said core is delayed the greatest amount only upon movement in one direction, unless said core is not moved in one direction to said point before its movement is reversed.

9. In a device of the type described, the combination with a solenoid having a movable core, a dashpot one element of which comprises said core for controlling the rate of movement of said core, said core being moved upon energization of said solenoid from its normal position to another position and being biased to return to said normal position, said dashpot having a vent, valve means controlling said vent, and means located at points adjacent each end of the path of travel of said core so as to be mechanically operated thereby in response to movement of said core to both of its said positions for operating said valve means only at a point adjacent the end of movement of said core to either of said positions whereby movement of said core is delayed the greatest amount only upon movement in one direction, unless said core is not moved in one direction to said point before its movement is reversed.

10. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, means for venting said dashpot means on at least one predetermined circuit interrupting operation of any such sequence of operations, whereby on said one predetermined operation the contacts are separated substantially instantaneously upon the occurrence of said predetermined electrical condition, and on another operation of any such sequence of operations said dashpot means is effective to delay separation of said contacts, and manually adjustable means for preventing operation of said venting means, so that every operation of said breaker will have the same time characteristics.

11. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, normally open vent means for said dashpot means so that at least the first circuit opening operation of any such sequence of operations is not delayed by said dashpot means, valve means for closing said vent means, said valve means being automatically operated by said breaker to close said vent means during each circuit closing operation to determine the circuit closing time, and said valve means also being automatically operated by said breaker to close said vent means during at least one predetermined circuit interrupting operation in any such sequence of operations.

12. In a device of the type described, the combination with a solenoid having a movable core, dashpot means for controlling the rate of movement of said core, said core being moved upon energization of said solenoid from its normal position to another position and being biased to return to said normal position, said dashpot means having a vent, valve means controlling said vent, said vent being normally open, said valve means being automatically operated to close said vent during said return movement, and said valve means being responsive to a predetermined energization of said solenoid which closely succeeds an earlier energization thereof to close said vent during movement of said core to said other position.

13. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means for delaying separation of said contacts a predetermined time after the occurrence of said predetermined condition, means for venting said dashpot means on at least one predetermined circuit interrupting operation of any such sequence of operations, whereby on said one predetermined operation the contacts are separated substantially instantaneously upon the occurrence of said predetermined electrical condition, and on another operation of any such sequence of operations said dashpot means is effective to delay separation of said contacts, and manually adjustable means for selectively locking said venting means open or closed so that each circuit opening operation of the breaker will have the same time characteristics.

14. In an automatic reclosing circuit breaker, separable contacts, electroresponsive means for causing separation of said contacts in response to a predetermined electrical condition of the circuit, said contacts automatically reclosing in response to a circuit interrupting operation, integrating means responsive to a sequence of a predetermined number of closely successive circuit interrupting operations to cause said contacts to remain separated, time delay means, which is normally ineffective to delay separation of said contacts whereby at least initial circuit opening operations in any such sequence of operations are effected substantially instantaneously, and means responsive to at least one circuit interrupting operation in any such sequence of operations for causing said time delay means to delay separation of said contacts a predetermined time after the occurrence of said predetermined condition for subsequent interrupting operations of such a sequence of operations, manual means for causing reclosing of said contacts after operation of said integrating means, and means independent of the position of said integrating means for causing an interrupting operation which closely succeeds such manual reclosure to be delayed by said time delay means.

15. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means having a movable part actuated at least during a part of each circuit interrupting and closing operation, means rendering said dashpot means ineffective to delay at least one predetermined circuit interrupting operation of any such sequence of operations whereby at least on said one operation the contacts are relatively quickly separated after the occurrence of said predetermined electrical condition, means mechanically operated by said movable part in response to a predetermined operation in any such sequence of operations to render said dashpot means effective to delay the next succeeding circuit interrupting operation of such sequence, and said dashpot means being effective to delay each circuit closing operation.

16. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means having a movable part actuated at least during a part of each circuit interrupting operation, means rendering said dashpot means normally ineffective to delay at least one predetermined circuit interrupting operation of any such sequence of operations whereby at least on said one operation the contacts are relatively quickly separated after the occurrence of said predetermined electrical condition, and means mechanically operated by said breaker in response to a predetermined operation in any such sequence of operations to render said dashpot means effective to delay the next succeeding circuit interrupting operation of such sequence.

17. In an automatic reclosing circuit breaker, separable contacts, electroresponsive means for causing separation of said contacts in response to a predetermined electrical condition of the circuit, said contacts automatically reclosing in response to a circuit interrupting operation, means responsive to a sequence of a predetermined number of closely successive circuit interrupting operations to cause said contacts to remain separated, fluid dashpot means having a movable part actuated at least during a part of each circuit interrupting operation, means rendering said dashpot means normally ineffective to delay at least one predetermined circuit interrupting operation of any such sequence of operations whereby at least on said one operation the contacts are relatively quickly separated after the occurrence of said predetermined electrical condition, means mechanically operated by said breaker in response to a predetermined operation in any such sequence of operations to render said dashpot means effective to delay the next succeeding circuit interrupting operation of such sequence, manual means for causing reclosing of said contacts after they have operated through said sequence and are maintained separated, and means responsive to said maintained separated condition of the contacts for maintaining said dashpot effective for a predetermined time following a manual closing operation so that an interrupting operation which closely succeeds such manual closing will be delayed by said time delay means.

HERBERT L. RAWLINS.
JAMES M. WALLACE.

REFERENCES CITED

The following references are of record in the file of this patent:

UNITED STATES PATENTS

| Number | Name | Date |
|---|---|---|
| 508,652 | Thomson | Nov. 14, 1893 |
| 685,430 | Pearson | Oct. 29, 1901 |
| 957,077 | Milke | May 3, 1910 |
| 1,426,460 | Cheney | Aug. 22, 1922 |
| 1,648,508 | Schweitzer | Nov. 8, 1927 |
| 2,100,893 | Anderson | Nov. 30, 1937 |
| 2,352,119 | Putt | June 20, 1944 |
| 2,414,786 | Lincks | Jan. 21, 1947 |